H. E. S. CHAYES.
DENTAL ATTACHMENT.
APPLICATION FILED OCT. 14, 1919.
1,380,040.
Patented May 31, 1921.
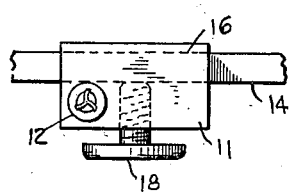
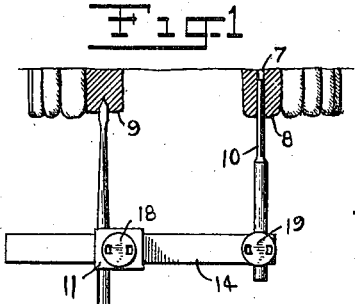
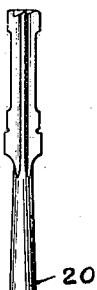
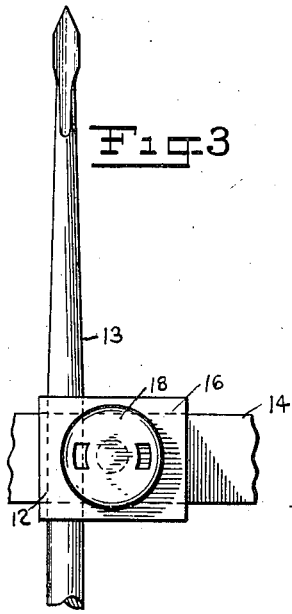
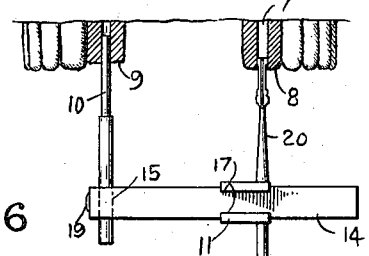
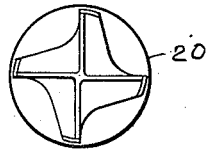

UNITED STATES PATENT OFFICE.

HERMAN E. S. CHAYES, OF NEW YORK, N. Y.

DENTAL ATTACHMENT.

1,380,040.  Specification of Letters Patent.  Patented May 31, 1921.

Application filed October 14, 1919. Serial No. 330,650.

*To all whom it may concern:*

Be it known that I, HERMAN E. S. CHAYES, a citizen of the United States, residing at New York, in the county of New York and State of New York, have invented certain new and useful Improvements in Dental Attachments, of which the following is a specification.

This invention has reference particularly to the construction of bridgework and its object primarily is to insure absolute parallelism at the abutments.

Accordingly, the invention may be said to reside in the provision of means for guiding the drill or cutting tool so as to produce a bore at one abutment in parallelism with the bore previously formed in the other abutment.

In the drawing I have illustrated the invention embodied in one practical form, but it will be apparent from what follows that certain changes and modifications may be made without departing from the true spirit and scope of the invention.

In this drawing, Figure 1 is a front view illustrating the use of the invention in drilling a bore for the pin of the second abutment, using the bore of the first abutment as a guide for insuring parallelism; Fig. 2 is a similar view showing the use of the second bore as a guide for the reaming out and truing up of the first bore; Figs. 3 and 4 are broken detail views of a drill and a reamer as held in the guide; Fig. 5 is a broken plan view of the guide; Fig. 6 is an end view of the reamer.

In the practical use of the invention, a bore 7, for the first bridge pin is first drilled in one of the bridge abutments 8, 9, and then this bore is used as a guide for drilling the bore for the second bridge pin by inserting a guide pin 10 in this first bore which supports a guide 11 for the tool which cuts the second bore.

In the illustration, this guide is in the form of a block having a guide passage 12 therethrough rotatably receiving the shank of the drill or cutting tool 13, and this block is adjustably engaged on a spacer bar 14, which has in one end a passage 15 parallel to the first passage 12, for receiving the guide pin 10.

The adjustment of the cutting tool guide on the spacer bar is obtained in the present instance by channeling the guide transversely, as indicated at 16 in Fig. 5, to receive the spacer bar and providing the lips or jaws 17 embracing the edge portions of the bar to confine the block thereto. A clamp screw 18 seated in the block and bearing against the bar at its inner end serves to secure the block in the position to which it is adjusted. In a similar way the spacer bar is adjustably secured on the shank of the guide pin by a clamp screw 19, seated in the end portion of the bar and bearing at its inner end on the guide pin 10.

By these means the spacer bar may be set at any point longitudinally on the guide pin and the cutting tool guide may be set at any required distance from the guide pin to suit the distance between the bridge abutments. Once properly set, the device provides a guide which insures the drilling of the second bore in absolute parallelism with the first bore.

After drilling the second bore, the first bore may be smoothed and cleaned out as by means of a reamer 20, illustrated in Figs. 2, 4 and 6, held in the passage in the guide block, reversing the device in this instance and using the second bore as a guide by engaging the guide pin in that passage, as shown in Fig. 2.

Similarly, the device may be again reversed to ream out the second bore, using the first bore this time as a guide. Larger sized guide pins may substituted in this instance to compensate for the increased size bore produced in the reaming action.

The device will be seen to be simple and compact and to be capable of lending itself to any required adjustments, parallelism being maintained in all such adjustments.

I claim:

1. In a device for producing parallel bores in dental bridgework, a guide pin for engagement in a bore in one of the bridge abutments, a spacer bar slidably adjustable longitudinally on said guide pin, and a cutting tool guide slidably adjustable longitudinally on the spacer bar to the plane of the second bridge abutment and provided with a guide passage disposed parallel to the guide pin for the reception of a cutting tool.

2. In a device for producing parallel bores in dental bridgework, a spacer bar having a passage through one end thereof, a guide pin slidably engaged in said passage, means for securing the guide pin in adjusted position in said passage, a tool guide horizontally slidably engaged on the spacer bar and provided with a tool guiding passage therethrough parallel to the guide pin passage and means for securing said tool guide in horizontally adjusted position on the spacer bar.

3. In a device for producing parallel bores in dental bridgework, a spacer bar having a passage through one end portion thereof, a guide pin slidably engaged in said passage, a clamp screw securing said guide pin in adjusted position in the passage, a channeled tool guide slidably engaged on the spacer bar and having jaws embracing the edges of the bar and confining said guide thereto, said guide having a tool guiding passage therethrough parallel to the guide pin passage and a clamp screw securing the tool guide in adjusted position on the spacer bar.

In testimony whereof I affix my signature.

HERMAN E. S. CHAYES.